United States Patent [19]

Young

[11] Patent Number: 5,154,766

[45] Date of Patent: Oct. 13, 1992

[54] METHOD FOR CONTROLLING SHADE OF HYDROUS KAOLIN PIGMENTS AND PRODUCTS OBTAINED THEREFROM

[75] Inventor: Raymond H. Young, Macon, Ga.

[73] Assignee: Engelhard Corporation, Iselin, N.J.

[21] Appl. No.: 792,580

[22] Filed: Nov. 15, 1991

[51] Int. Cl.$^5$ .............................................. C04B 14/04
[52] U.S. Cl. .................... 106/416; 106/486; 501/146; 501/147
[58] Field of Search ....................... 106/416, 486, 418; 501/144, 145, 146, 147

[56] References Cited

U.S. PATENT DOCUMENTS

| | | | |
|---|---|---|---|
| 3,309,214 | 3/1967 | Podschus et al. | 106/486 |
| 3,434,855 | 3/1969 | Webb | 106/486 |
| 3,775,595 | 11/1973 | Rosse et al. | 219/432 |
| 4,014,709 | 3/1977 | Dykstra et al. | 501/147 |
| 5,011,534 | 4/1991 | Berube et al. | 501/144 |
| 5,047,375 | 9/1991 | Dunaway et al. | 501/145 |

FOREIGN PATENT DOCUMENTS 350049 7/1989 European Pat. Off. .
356250 8/1989 European Pat. Off. .

OTHER PUBLICATIONS

Hawleys Condensed Chemical Dictionary Eleventh Edition. Sax et al., 1987 p. 724.

*Primary Examiner*—Mark L. Bell
*Assistant Examiner*—Paul Marcantoni
*Attorney, Agent, or Firm*—Inez L. Moselle

[57] ABSTRACT

Novel hydrous kaolin pigments comprising a major weight percent of a conventional hydrous kaolin pigment and a minor amount of a specific form of added discrete iron oxide, specifically magnetite, uniformly physically admixed therewith. Pigments of the invention have brightness values of about 78% to 85% and "b" values in the range of −1 to +4.

4 Claims, No Drawings

METHOD FOR CONTROLLING SHADE OF HYDROUS KAOLIN PIGMENTS AND PRODUCTS OBTAINED THEREFROM

This invention relates to novel modified hydrous kaolin clay pigments characterized by improved shade, specifically by reduced yellowness. The invention relates especially to kaolin pigments especially adapted for use in coating paper.

Refined hydrous kaolin pigments are widely used alone or as extenders by the paper industry to coat and fill paper. Such pigments are also used as extenders by the paint industry. Generally, high quality and premium grades are characterized by high brightness (whiteness), conventionally measured by Elrepho or GE brightness meters. Shade is an important consideration in some uses. Specifically, a yellow cast may be undesirable.

To prepare these high and premium grades, selective mining of kaolin crudes is practiced. The crudes are then upgraded by so call "wet-processing" which includes forming the clay ore into an aqueous pulp, degritting the pulp, fractionating the pulp to recover the particles of desired particle size range, e.g., 80% or 90% by weight finer than 2 micrometers, and bleaching. High quality grades and hydrous kaolin pigments have brightness values above 86%. Premium grades have brighter values above 88%, sometimes 90% or above. Processing steps intended to remove colored impurities, including discrete ferruginous and titaniferous particles, are frequently included in the processing. These methods include selective flotation, selective flocculation and magnetic separation. Bleaching is practiced to remove iron stain.

The shade of kaolin pigments is reported by "L" "a" "b" values. The "b" value is a measure of yellowness. Reduced "b" values reflect decreases in yellowness. Truly "blue" pigments have negative "b" values. Typically, "b" values of commercial Georgia hydrous kaolin pigments are in the range of +2 to +8. See U.S. Pat. No. 5,011,534 (Berube et al).

The present invention provides novel hydrous kaolin pigments comprising a major weight percent of a conventional hydrous kaolin pigment and a minor amount, generally less than 1% by weight, of a specific form of added discrete iron oxide, specifically magnetite, uniformly physically admixed therewith. Pigments of the invention have brightness values of about 78% to 85% and "b" values in the range of −1 to +4. Addition of discrete iron to a hydrous kaolin pigment intended for use by the paper or paint industry to prepare pigments of the invention is contrary to the conventional wisdom of physically removing ferruginous impurities, including iron oxides, from kaolin intended for such uses.

In putting the invention into practice, the hydrous kaolin clay component is usually a wet-processed fraction of crude, e.g., a #2, #1 or #0 grade pigment. Brightness of the hydrous kaolin in the absence of added magnetite is in the range of 86% to 93%. The "b" value is typically in the range of 3.5 to +7.

Magnetite is added in the form of a fine powder. Typically, all of the particles are finer than 44 um. (as determined by 325 mesh U.S. screen). The kaolin and magnetite can be added to a previously formed dispersed slurry of kaolin pigment. If desired, a suspending agent such as carboxy methyl cellulose (CMC) can be used to minimize separation of magnetite from the kaolin particles. Uniform mixing of component is essential. Typically the amount of magnetite added is 0.005% to 0.10% based on the dry weight of the kaolin.

To assure uniform mixing it may be advantageous to provide a "preconcentrate" by premixing magnetite and a portion of the hydrous pigment to apparent homogeneity and mixing the preconcentrate with the balance of the hydrous kaolin pigment.

The following example is illustrative of the invention.

A sample of crude kaolin was made down with N-brand sodium silicate solution at a level of 4 dry#/ton in water at a total solids content of 45%. The resulting dispersed slurry was then screened through a 325 mesh screen to remove all particles larger than 44 um. The screened slurry had a particle size of 72% by weight less than 2 um. which was increased to 92% less than 2 um. by fractionation in a laboratory centrifuge. The slurry was then flocced using 4#/ton of alum and sulfuric acid to a pH of 3. The flocced slurry was filtered and rinsed with water until the specific resistance of the filter cake was greater than 7000 ohms when measured as a 20% slurry. The filter cake was then pressed under pressure to increase the solids content to greater than 70% and a dispersant composed of 55% soda ash and 45% sodium polyacrylate was added at a level of 6#/ton. The solids of the dispersed slurry were then adjusted to 70.0%. The slurry had a pH value of 6.2 and a low shear viscosity measured by a Brookfield Viscometer of 260 cps. using the #1 spindle at 20 RPM. The GE brightness of a dried sample was 86.9%.

A sample of the slurry to furnish 1000 g. of dry kaolin was weighed into a beaker and placed under a Talboy stirrer and the mixture stirred at medium speed while powdered magnetite was added. The appropriate amount of the powdered magnetite (ferrous-ferric oxide) to furnish the percentage given in Table I was added and the slurry stirred for an additional 30 minutes. A sample of the slurry was dried in a conventional oven, pulverized, and the GE brightness measured. A color analysis of the dried sample was obtained using an Elrepho 2000 photometer to determine the CIE L*a*b* values. The data collected is given in Table I.

TABLE I

| % Added | GEB | COLOR | | | Brookfield Viscosity, Cp. | pH |
|---|---|---|---|---|---|---|
| | | L* | a* | b* | | |
| Control | 86.9 | 95.76 | −0.54 | 3.97 | 260 | 6.2 |
| 0.005 | 86.7 | 95.58 | −0.59 | 3.72 | 253 | 6.2 |
| 0.010 | 86.4 | 95.42 | −0.66 | 3.64 | 248 | 6.2 |
| 0.015 | 86.2 | 95.08 | −0.67 | 3.41 | 243 | 6.2 |
| 0.020 | 85.7 | 94.96 | −0.66 | 3.28 | 245 | 6.2 |
| 0.040 | 84.9 | 94.15 | −0.70 | 2.72 | 250 | 6.3 |
| 0.060 | 83.8 | 93.60 | −0.73 | 2.40 | 255 | 6.3 |

Samples containing various amounts of additive were also measured for their Brookfield viscosity (low shear). The samples were aged at 130° F. and the viscosity remeasured to determine if there was any influence of the additive on the viscosity of the slurries. The aged viscosities were as good as a or better than the untreated control.

An abrasion measurement was carried out on the control and the sample containing the highest level of the additive. There was no difference between the two. Although the additive responds to a magnet in the dry state, there was essentially no weight of the additive adhering to a magnetic stirring bar after stirring a slurry for 1 hour.

What is claimed is:

1. A hydrous kaolin pigment having improved shade, said pigment comprising a uniform physical mixture of particles of high brightness hydrous kaolin with from 0.005% to 0.10% by weight of fine particle size magnetite, said pigment having a brightness of at least 76% and a "b" value below +4.

2. The pigment of claim 1 wherein the high brightness hydrous kaolin has a brightness in the range 86 to 93%.

3. The pigment of claim 1 wherein the magnetite has particle size of <44 um.

4. The pigment of claim 1 wherein said hydrous kaolin has a "b" value of <+5 and said pigment containing said magnetite has a brightness of 78−85%.

* * * * *